C. L. SMITH.
ACCOUNT BOOK.
APPLICATION FILED FEB. 8, 1916.
1,238,585.
Patented Aug. 28, 1917.
3 SHEETS—SHEET 1.
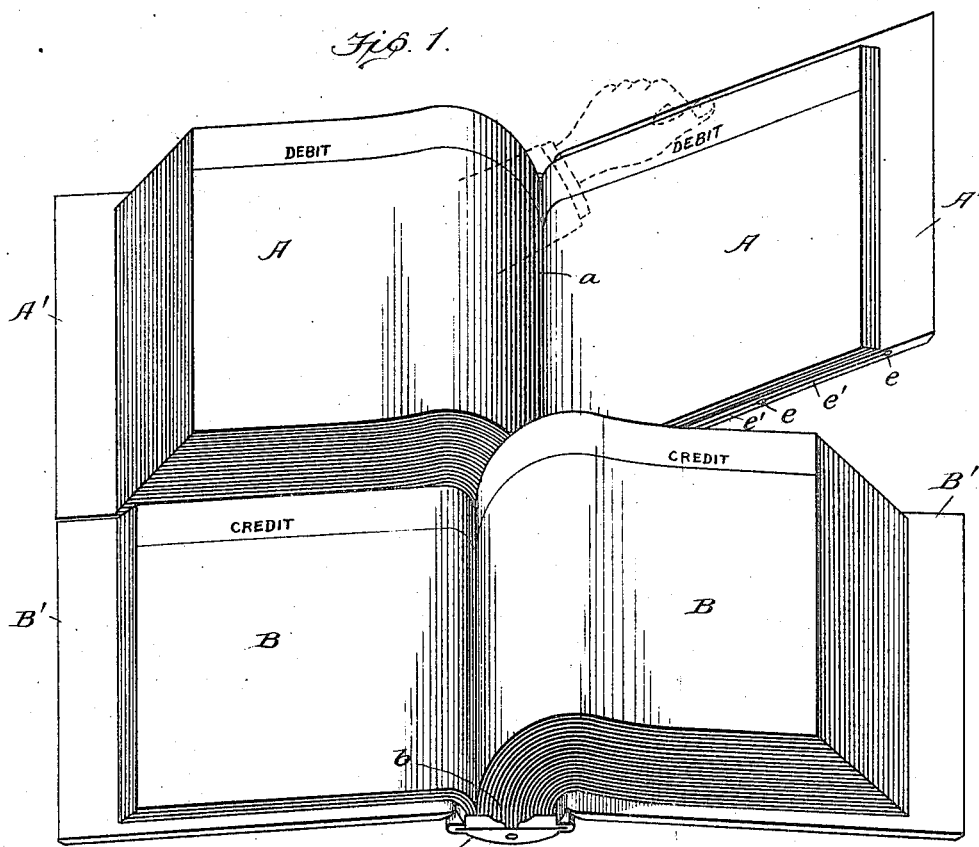
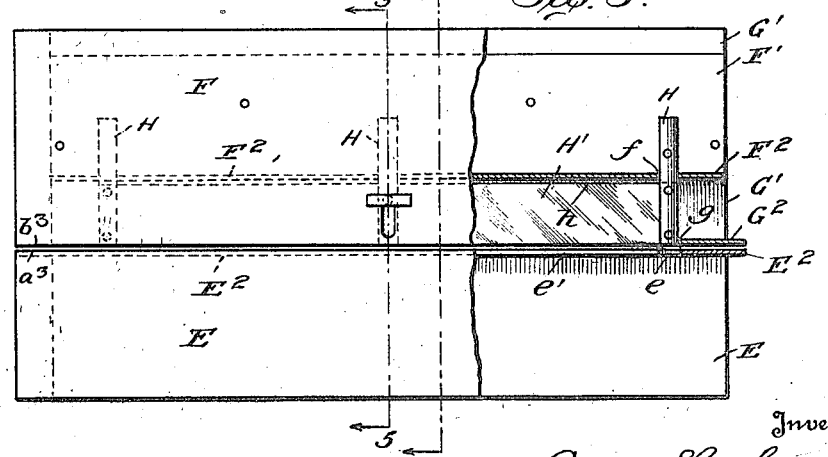

C. L. SMITH.
ACCOUNT BOOK.
APPLICATION FILED FEB. 8, 1916.
1,238,585.
Patented Aug. 28, 1917.
3 SHEETS—SHEET 2.
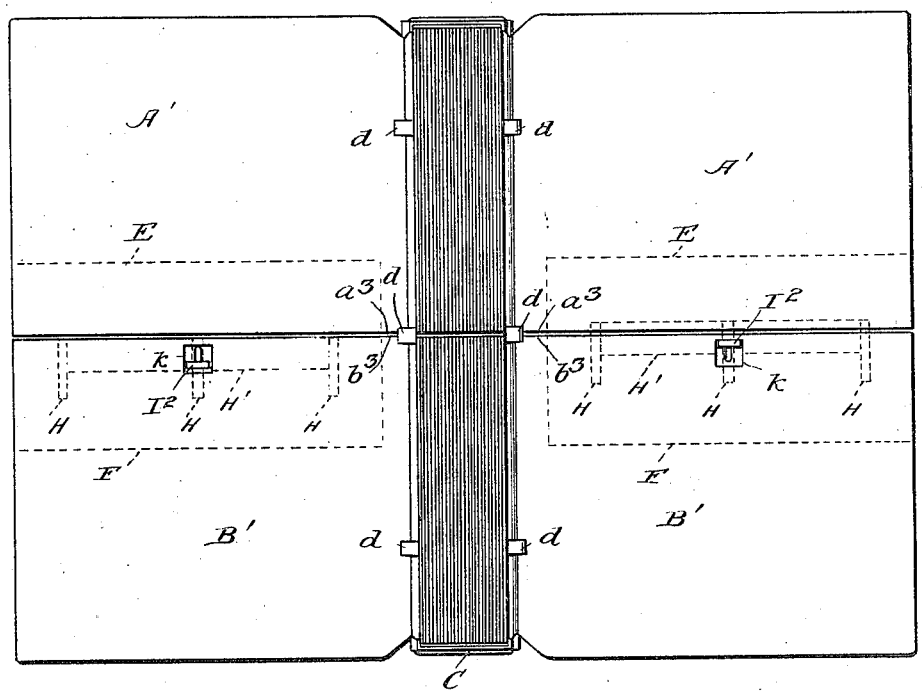
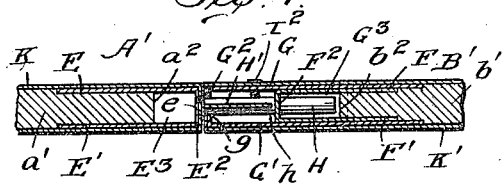
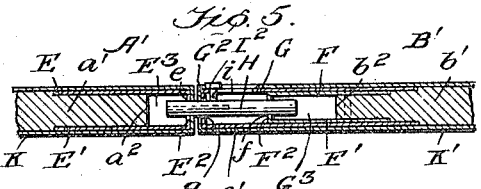
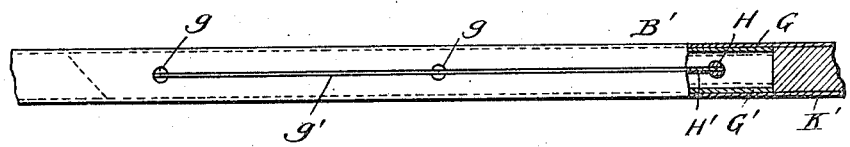
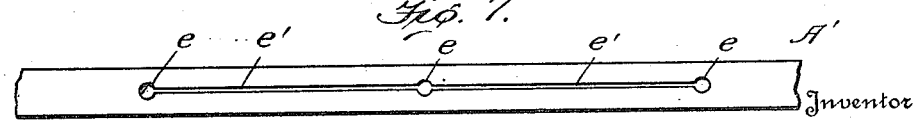

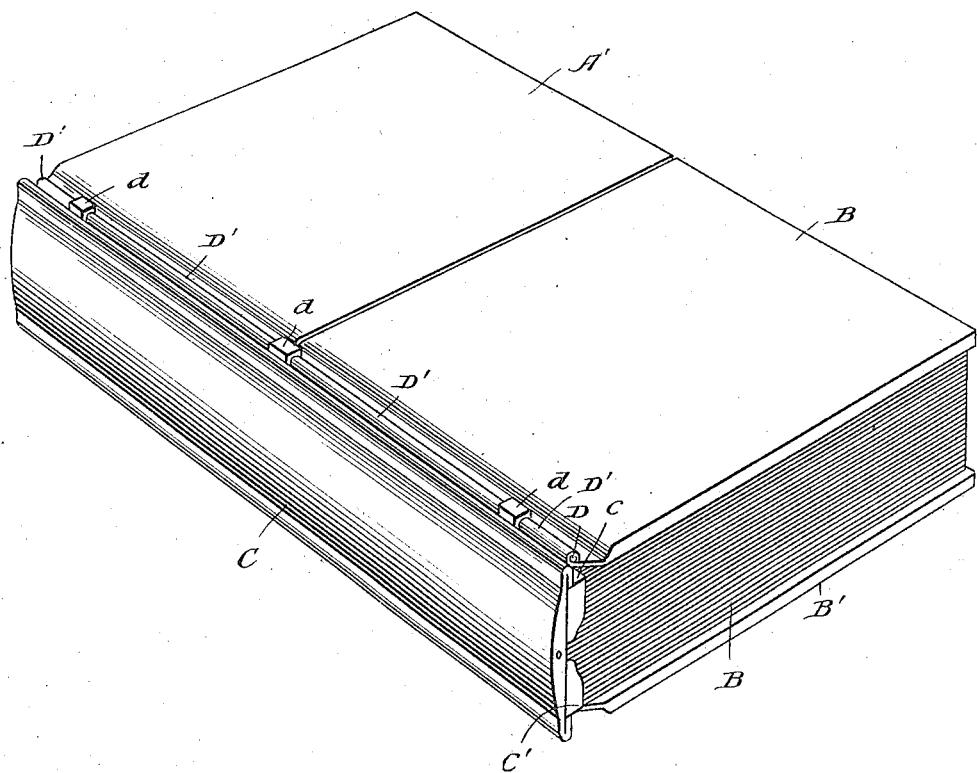

UNITED STATES PATENT OFFICE.

CONNOR L. SMITH, OF CONCORD, NORTH CAROLINA.

ACCOUNT-BOOK.

1,238,585.

Specification of Letters Patent.  Patented Aug. 28, 1917.

Application filed February 8, 1916.  Serial No. 76,954.

*To all whom it may concern:*

Be it known that I, CONNOR L. SMITH, a citizen of the United States, residing at Concord, in the county of Cabarrus and State of North Carolina, have invented certain new and useful Improvements in Account-Books; and I do hereby declare the following to be a full, clear, and exact description of the same, reference being had to the accompanying drawings, forming part of this specification.

This invention relates to a novel book construction. In the specific embodiment herein described, the object of the invention is realized in the provision of an account book, which is a simple and convenient combination of cash book, journal and ledger, whereby the keeping of numerous running accounts is greatly simplified and the necessity of transferring or posting items from a cash book or journal to the ledger entirely obviated. According to the present improved arrangement, the work of the bookkeeper is not only simplified, but also the work of the auditor in auditing a set of books, the account book being so constructed that any page containing debit items may be opened simultaneously with any page containing credit items, and, therefore, with one original entry direct to the ledger one account may be debited and another account credited.

A full understanding of the invention will be attained from the ensuing detail description, when taken in connection with the accompanying drawings which illustrate a structural embodiment of the same in a preferred form.

The novel features of the invention will be particularly pointed out and specified in the claims at the end of the specification.

In the drawings:

Figure 1 is a perspective of a book embodying the present improvements, the book being shown with the cover leaves and the groups of book sheets in open position.

Fig. 2 is a plan view of the book illustrated in Fig. 1.

Fig. 3 is a plan view on an enlarged scale of the improved mechanism for locking the independent cover leaves together, a portion being broken away to illustrate the interior arrangement of the parts.

Fig. 4 is a transverse section taken on the line 4—4 of Fig. 3, showing the parts of the locking mechanism in the positions which they assume when the adjacent independent cover leaves on the same side of a book are unlocked.

Fig. 5 is a transverse section taken on the line 5—5 of Fig. 3, showing the parts of the locking mechanism in the positions which they assume when the adjacent independent cover leaves on the same side of a book are locked together.

Fig. 6 is a plan view partly in section of the inner transverse edge of one of the cover leaves, showing the locking mechanism in front elevation.

Fig. 7 is a plan view of the inner transverse edge of the opposed cover leaf showing in front elevation the socket receiving the bolt illustrated in Fig. 6.

Fig. 8 is a perspective of a closed book.

Like characters of reference in the several figures indicate the same parts.

According to the invention, a plurality of groups of book sheets, preferably two, are provided and these are respectively indicated by the letters A B, as shown in Fig. 1. The upper group of sheets A is composed of a plurality of account sheets and in the present instance the debit items of a ledger are entered on the account sheets of said upper group; the lower group of sheets B is likewise composed of a plurality of account sheets, but these are for the entry of the credit items. Both groups A and B have their inner edges $a$ $b$ bound one above the other in substantial alinement to a common backing C. This backing is preferably, although not necessarily, of the type employed in loose-leaf ledger systems, whereby old account sheets may be removed and new ones substituted as desired. The backing C is best shown in Fig. 8, and is provided with upper and lower inwardly projecting extensions or ledges $c$, $c'$, said ledges running approximately the entire length of the backing and between which the inner edges of the account sheets constituting the upper and lower groups are bound.

Each ledge is provided on its outer face, as for instance, the upper ledge $c$ shown in Fig. 8, with a plurality of alined lugs or bearing members $d$, which mutually support the pintle D of a hinge. An individual pair of cover leaves is provided for each individual group, and the several cover leaves are formed with socketed hinge portions D' adapted to receive the pintles D, there being, in the present instance four cover leaves, the upper pair A' and the lower pair B', hinged on the pintles D on each side of the book. The above described arrangement provides a structure which has the appearance and characteristics of two books, one mounted above the other on a common backing, but with the cover leaves and leaves of one group of sheets entirely independent of the other, whereby each group may be opened to any desired page without in any manner conflicting or interfering with the leaves of the other group.

The two groups A and B of account sheets are designed respectively for the entry of debit and credit items in each account; in other words, all the debit items of one account are entered in the upper group A and all the credit items of the same account and all other accounts are entered in the lower group B. In the use of the book, therefore, the name of the person with whom an account is kept is entered in the usual manner at the top of the desired page in both the debit and credit sections of the book, and all the debit items and credit items of the account are entered in their respective sections alone, there being no necessity for employing with this arrangement either a cash book or a journal from which the items must be posted to a ledger.

As the pages of the upper group or debit section may be opened independently of the pages of the lower group or credit section, posting of the accounts is greatly simplified and this is all accomplished with the original entry instead of employing the methods now in use, where the same entries are first made in a journal or cash book and then in turn posted in the ledger. In other words, according to the present improvements, a double handling of the items is not required so that the liability of making mistakes in the posting of the ledger is greatly reduced.

In posting the accounts, it quite frequently happens that a sheet of the upper group A will be turned to nearly its last page, as shown in Fig. 1, and a sheet of the lower group B must be turned to one of the first pages. Under the above circumstances, if the last debit entry is close to the bottom of the page, the thick pile of sheets in the credit side below will obstruct the view of the debit page, if the upper group or debit section is allowed to lie flat on the table. The independent cover leaves provided for each group of sheets obviate this disadvantage, as will readily appear from Fig. 1, since the cover leaf A' of the upper group may be lifted by the hand, independently of the cover leaf B', of the lower group, and the obstructed debit page lifted approximately to the level of the credit page beneath, or to such position as will give the bookkeeper or auditor a clear view of all the entries on both pages.

The invention also provides means for locking together the independent cover leaves on one or on both sides of the book when desired. It will be found particularly advantageous to lock the cover leaves together when carrying the books around, in which the since ledgers or account books, in which the utility of the invention is particularly realized, are often rather heavy cumbersome affairs, and, otherwise some little difficulty might be experienced in moving the book from place to place. The locking mechanisms for the pair of cover leaves on each side of the book are, in the present instance, similar in construction, and, hence only one of the locking mechanisms will be described, although both are illustrated in the Fig. 2 of the drawings.

The cover leaves A' B' of the present book are relatively thick whereby one cover leaf B', for instance, may contain within its boundaries the movable portion of the locking mechanism when not in use and the adjacent cover leaf A' may be provided with the socket also within its boundaries adapted to receive the locking member or bolt, when it is advanced to lock the two cover leaves together in the manner to be presently described. Referring now particularly to Figs. 2 to 7, inclusive, the upper cover leaf A' is provided with a bolt-receiving chamber extending inwardly from its inner transverse edge $a$. This chamber is formed preferably by cutting away a rectangular portion from the board $a'$ of the cover leaf, and filling the gap thus formed with a metal frame, consisting of upper and lower plates E, E', secured respectively in any suitable manner to the upper and lower sides of the board $a'$, and having the vertical connecting wall or strip $E^2$ flush with the edge $a^3$ of the inner uncut-away portion of the board $a'$. The vertical connecting wall $E^2$ in fact forms the main portion of the inner transverse edge of the cover leaf and, as shown in Fig. 4, is spaced from the transverse wall $a^2$ of the board $a'$ so as to provide a chamber $E^3$ which receives the bolt of the locking mechanism when it is desired to lock the cover leaves A' B' together.

A rectangular portion is likewise cut away from the board $b'$ of the cover leaf B', this cutaway portion, however, being of greater width than that of the board $a'$. The metal frame, fitted to the board $b'$ consists of inner and outer frame members. The inner member consists of upper and lower plates F, F' secured to the board $b'$, and having their forward portions, which are extended beyond the wall $b^2$ of the board $b'$ connected by a vertical web or strip $F^2$. Said strip $F^2$ is, however, recessed beyond the transverse edge $b^3$ of the portion $b^4$ of the board $b'$, as will appear from Fig. 3. The outer member likewise consists of upper and lower plates, respectively, G G' having their forward edges connected by a vertical web or strip G² and their rear portions lying over the plates F F'. Strip G² is flush with the edge $b^3$ of the board and with said edge forms in effect the inner transverse edge $b$ of the cover leaf B', this edge $b$ facing the edge $a$ of the cover leaf A'. The bolt is received within the chamber G³ between strip G² and edge $b^2$.

Strip E² is provided with a plurality of spaced round openings $e$, preferably three, as shown in Fig. 7, these being connected by a slot $e'$ extending along the strip. The opposed strip G² is likewise provided with a plurality of spaced round openings $g$, also three in number, and connected by a similar slot $g'$, as shown in Fig. 6. When the two cover leaves are brought into substantially the same horizontal plane, the openings in strip E² will aline with the openings in strip G². The bolt which is within socket G³ consists of a plurality of pins H corresponding in number and diameter with the round holes $g$, the said pins being connected by a transverse web H' of a width adapted to be projected with the pins H through the slots $g'$ and $e'$ respectively. The pins H extend beyond the edge $h$ of the web H' and slide in round holes $f$ in the web F², said holes being in alinement with the holes $g$ in web G². Thus the web F² forms a supporting guiding member for the bolt. A finger piece I secured to the center pin H of the bolt provides a means for sliding the bolt out of the chamber G³, as desired. Preferably the finger piece I is adapted to slide within a slot $i$ in the upper plate G and its knob I² is substantially flush with the inner surface of the cover leaf so as not to interfere with the leaves of the book, when the book is closed. In operating the locking mechanism to lock the cover leaves A', B' together, the cover leaves are first positioned so that they lie substantially in the same plane. The finger piece I is then grasped and moved forward toward cover leaf A', thereby sliding the bolt forwardly out of the chamber G³ in cover leaf B' into the receiving chamber E³ in cover leaf A', the pins H sliding respectively in holes $g$ and $e$, and the web H' in slots $g'$ and $e'$ until the parts assume the positions shown in Fig. 5 with cover leaf A' locked to cover leaf B'. The pins H serve as a means for strengthening the web H', and the whole construction makes a very satisfactory bolt. By shifting finger piece I in the opposite direction, the bolt is moved out of chamber E³, thereby releasing the cover leaves.

In order to preserve the appearance of the book the outer layer K of the binding is extended over and around the plates E, E', respectively, of the cover leaf A'; similarly, the outer layer K' of the cover leaf B' is extended around the plates G G' of said cover leaf. Both the outer layers K K' are provided with suitable holes and slots adapted to register respectively with the holes and slots in the webs E² and G². The outer layer K' is also provided with a slot $k$, as shown in Fig. 3 on the inner surface of the cover leaf to permit sliding of the knob I² of the finger piece.

What is claimed is:—

1. A book embodying a plurality of independent groups of book sheets, a common backing to which the inner edges of said groups are bound in substantial alinement one above the other, and independent cover leaves for each group of sheets, the inner edges of the cover leaves being hinged to the common backing one above the other on each side of the groups of book sheets, substantially as described.

2. A book embodying a plurality of independent groups of book sheets bound at their inner edges in substantial alinement one above the other, independent cover leaves for each group of sheets, a common support to which the inner edges of the cover leaves are hinged one above the other on each side of the groups of book sheets, whereby one cover leaf may be opened independently of another cover leaf on the same side of the book, and means adapted to lock together the cover leaves on the same side of the book, whereby all the cover leaves on that side of the book may be turned in unison.

3. A book embodying a plurality of independent groups of book sheets bound at their inner edges in substantial alinement one above the other, independent cover leaves for each group of sheets, a common support to which the inner edges of said cover leaves are hinged one above the other on each side of the groups of sheets, a bolt-receiving chamber extending from the transverse edge of one of said cover leaves, a bolt mounted in the next adjacent cover leaf on the same side of the book and adapted to be projected into said chamber, and means for moving said bolt into and out of said chamber.

4. A book embodying a plurality of independent groups of book sheets bound at their inner edges in substantial alinement one above the other, independent cover leaves for each group of sheets, a common support to which the inner edges of said cover leaves are hinged one above the other on each side of the groups of sheets, a locking member mounted in one of said cover leaves and adapted to be projected from its inner transverse edge, said member including a plurality of locking pins, a web connecting said pins whereby they may move in unison, an opening extending inwardly from the opposed inner transverse edge of the adjacent cover leaf on the same side of the book, and means for moving said locking member into and out of the opening.

5. A book embodying a plurality of independent groups of book sheets bound at their inner edges in substantial alinement one above the other, independent cover leaves for each group of sheets, a common support to which the inner edges of said cover leaves are hinged one above the other, on each side of the groups of sheets, a locking member mounted in one of said cover leaves and adapted to be projected from its inner transverse edge, guiding means in the cover leaf for the locking member, said member including a plurality of locking pins, a web connecting said pins whereby they may move in unison, an opening extending inwardly from the opposed inner transverse edge of the other cover leaf on the same side of the book, and means for moving said locking member into and out of the said opening.

CONNOR L. SMITH.

Copies of this patent may be obtained for five cents each, by addressing the "Commissioner of Patents, Washington, D. C."